Aug. 20, 1940.  A. E. CARLSON  2,211,763
CINEMATOGRAPHIC APPARATUS
Filed Nov. 22, 1938

Inventor
Adolphe E. Carlson
by Roberts, Cushman & Woodbury
his Attys.

Patented Aug. 20, 1940

2,211,763

UNITED STATES PATENT OFFICE 2,211,763

CINEMATOGRAPHIC APPARATUS

Adolphe E. Carlson, Burbank, Calif., assignor to Technicolor Motion Picture Corporation, Los Angeles (Hollywood), Calif., a corporation of Maine Application November 22, 1938, Serial No. 241,725

2 Claims. (Cl. 88—17)

In the art of cinematography it is frequently desirable simultaneously to feed two films through the same film gate in face to face contact, that is front to front, back to back or front to back. For example, in color cinematography it is now common practice to employ a bipack camera adapted to feed two negatives through the same film gate with their emulsion sides in contact with each other. For this purpose the two emulsions should be in intimate contact at the focal plane but there is such a pronounced tendency for trapped air to hold the films apart that much difficulty has been encountered in attempting to keep both films in focus.

Objects of the present invention are to provide apparatus which avoids the aforesaid difficulty, which holds the films in intimate contact, which guides the film in uniform and constant relationship to the focal plane, which is simple in construction and durable in use, and which involves no difficulty in threading the film through the apparatus.

According to the present invention the two films are separated just before they enter the film gate so that they are brought into snug contact at the film gate along gradually converging paths thereby more effectively to counteract the tendency to trap thin pockets of air between the films. The film separator is preferably in the form of a pin mounted at one end adjacent corresponding edges of the two films and projecting edgewise of the film, the other end of the pin being unobstructed so that the films may be threaded with facility.

By lubricating the margins of the films they may be confined more closely and accurately as they pass through the film gate, thereby to maintain the films more uniformly and constantly in focus. According to this invention the lubricating device is associated with the aforesaid separator so that the separator serves not only the aforesaid purpose but also to press the films in contact with the lubricating surfaces.

For the purpose of illustration a typical embodiment of the invention is shown in the accompanying drawing in which Fig. 1 is a side elevation of a portion of a camera with the cover broken away and parts in section;

Figure 1:
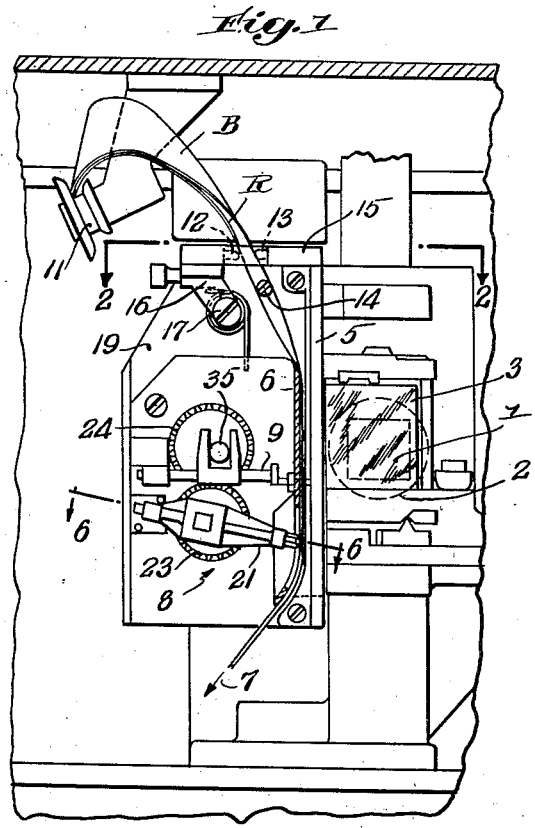

The particular embodiment of the invention chosen for the purpose of illustration is similar to that disclosed in the patent to J. A. Ball, et al. No. 2,072,091, granted March 2, 1937, to which reference is made for a description of those parts of the illustrated camera which are not directly related to the subject-matter of the present invention. As described in the aforesaid patent the illustrated camera is designed to expose three films simultaneously from the same point of view along the same optical axis, which is perpendicular to the paper as indicated at 1 in Fig. 1 where the broken circle 2 indicates the general position of the single lens. Mounted behind the lens a prism unit 3 having an interior light-dividing surface which is not shown but which is located in the plane indicated by the broken line 4 in Fig. 2. The light-dividing surface permits part of the light to be transmitted along the optical axis 1 to the film G while reflecting the rest of the light to the left (Figs. 1 and 2) through the aperture plate 5 to the bipack films B and R which are fed through the film gate 6 in face to face contact in the direction indicated by the arrow 7 in Fig. 1.

Figure 6:
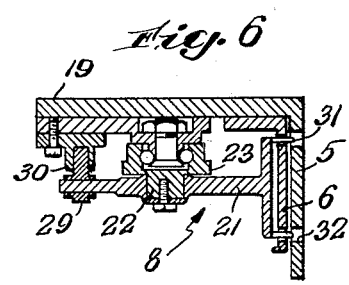
Fig. 6 is a section on line 6—6 of Fig. 1.

The films B and R are fed step by step by means of the film advancing mechanism 8 which may be of any suitable type, the films being accurately registered after they come to rest by means of the registering mechanism shown at 9 in Fig. 1. As shown in Figs. 1 and 6 the illustrated film-feeding mechanism comprises an oscillatory arm 21 actuated by a pin 22 which projects eccentrically from the gear 23. The rear end of the arm 21 slides in the head of a pin 29 journaled at 30 and the forward end of the arm carries film-feeding teeth 31 which extend through the slots 32 in the gate 6. The gear 23 is driven through the kinematic train comprising gear 24, shaft 25, worm gears 26 and 27 and shaft 28. The other film G is fed through similar mechanism actuated through gears 33 and 34. The registering pin 9 is reciprocated back and forth by pin 35 eccentrically mounted on gear 24.

Figure 3:
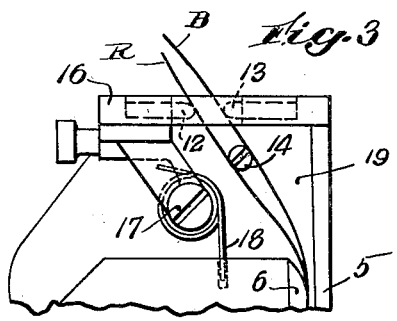
Fig. 3 is a portion of Fig. 1 on a larger scale.
Figure 4:
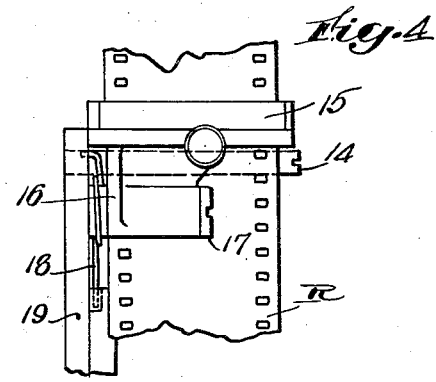
Fig. 4 is a detail view from the left of Fig. 1.
Figure 5:
Fig. 5 is a section on line 5—5 of Fig. 2.
Figure 2:
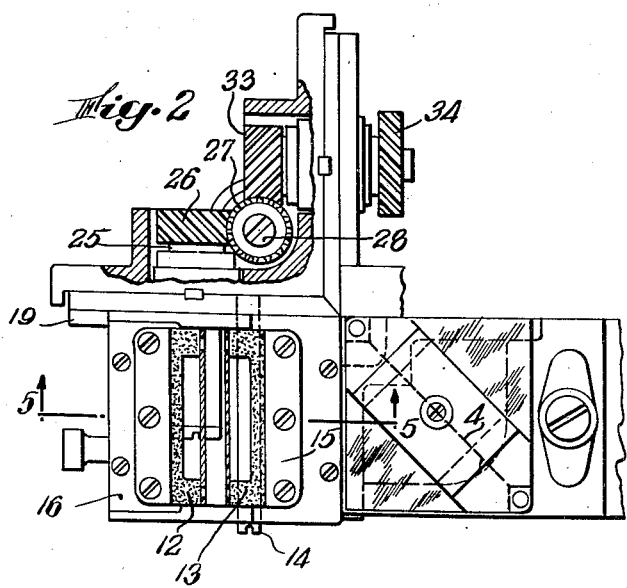
Fig. 2 is a section on line 2—2 of Fig. 1.

According to the present invention the films B and R are fed over a guide roll 11, thence obliquely between lubricating pads 12 and 13, thence on opposite sides of a guide pin or separator 14 and thence through the film gate. As shown in Fig. 2 the lubricating pads are shaped to engage only the margins of the film. The pad 13 is fixedly mounted as indicated at 15 whereas the pad 12 is pivotally mounted by means of a bracket 16 pivoted on a pin 17. The bracket is normally held in the position shown in the figures by means of the spring 18 but may be swung in a counterclockwise direction (Figs. 1 and 3) to facilitate the threading of the films. The guide pin 14 is mounted at its inner end in the plate 19, the outer end of the pin being free and unobstructed so that the films may be readily threaded through the mechanism.

As the films B and R feed obliquely through the lubricating device the margins of the film are slightly lubricated by engagement with the pads 12 and 13. The pin 14 serves the double purpose of causing the films to rub against the pads 12 and 13 and also to hold the films apart so that they do not come into contact until they enter the film gate. By gradually bringing the films into contact along converging paths all of the air may be squeezed out from between the films as they are pressed into contact in the film gate. Thus both films may be brought into exact focus so that the images resulting from the exposure in the film gate are sharply defined.

It should be understood that the present disclosure is for the purpose of illustration only and that this invention includes all modifications and equivalents which fall within the scope of the appended claims.

I claim:

1. Cinematographic apparatus comprising a film gate having a film contacting entrance through which two films may be fed in face to face contact, film lubricating pads disposed on opposite sides of the path of said films, at a distance therebetween considerably larger than the combined thickness of said films, for lubricating the margins of said films before they reach said gate, a support adjacent said films, and means extending from said support between and edgewise of said films directly in advance of said gate for separating said films intermediate said pads and said entrance and pressing the separated films into contact with said pads, said separating means cooperating with said entrance to cause the films to contact at the entrance along gradually converging paths.

2. Cinematographic apparatus comprising a film gate having a film contacting entrance through which two films may be fed in face to face contact, film lubricating pads disposed on opposite sides of the path of said films, at a distance therebetween considerably larger than the combined thickness of said films, for lubricating the margins of said films before they reach said gate, a support adjacent corresponding edges of said films, and a pin extending from said support between and edgewise of said films directly in advance of said gate for separating said films intermediate said pads and said entrance and pressing the separated films into contact with said pads, said pin cooperating with said entrance to cause the films to contact at the entrance along gradually converging paths.

ADOLPHE E. CARLSON.